(12) United States Patent
Luippold

(10) Patent No.: US 9,314,131 B2
(45) Date of Patent: Apr. 19, 2016

(54) DRINKS MACHINE

(75) Inventor: Gregor Luippold, Grünwald (DE)

(73) Assignee: BSH Hausgeraéte GmbH, Munich (DE)

( * ) Notice: Subject to any disclaimer, the term of this patent is extended or adjusted under 35 U.S.C. 154(b) by 500 days.

(21) Appl. No.: 13/061,524

(22) PCT Filed: Aug. 27, 2009

(86) PCT No.: PCT/EP2009/061076
§ 371 (c)(1),
(2), (4) Date: Mar. 1, 2011

(87) PCT Pub. No.: WO2010/031672
PCT Pub. Date: Mar. 25, 2010

(65) Prior Publication Data
US 2011/0259200 A1    Oct. 27, 2011

(30) Foreign Application Priority Data
Sep. 17, 2008   (DE) .......................... 10 2008 042 177

(51) Int. Cl.
*A47J 31/00* (2006.01)
*A47J 31/44* (2006.01)
*B65B 1/04* (2006.01)
*B65B 3/00* (2006.01)
*B67C 3/00* (2006.01)

(52) U.S. Cl.
CPC .......... *A47J 31/4407* (2013.01); *A47J 31/4482* (2013.01); *A47J 2201/00* (2013.01)

(58) Field of Classification Search
CPC  A47J 31/4407; A47J 31/4482; A47J 2201/00
USPC ................... 99/279, 284; 141/375, 376, 378; D7/311, 507, 509
See application file for complete search history.

(56) References Cited

U.S. PATENT DOCUMENTS

| 5,217,288 A | 6/1993 | Johnson |
| 2003/0029322 A1 | 2/2003 | Rolland |
| 2003/0106434 A1 | 6/2003 | Kaiser |
| 2006/0065126 A1 | 3/2006 | Turi |
| 2007/0266861 A1* | 11/2007 | Hart ............................... 99/279 |
| 2008/0173182 A1* | 7/2008 | Boerner ................ A47J 31/005 99/281 |

FOREIGN PATENT DOCUMENTS

| DE | 3903003 A1 | 8/1990 |
| EP | 1733662 A1 | 12/2006 |
| FR | 2883089 A1 | 9/2006 |
| WO | 2006104575 A1 | 10/2006 |

* cited by examiner

*Primary Examiner* — Dana Ross
*Assistant Examiner* — Lindsey C Teaters
(74) *Attorney, Agent, or Firm* — Laurence A. Greenberg; Werner H. Stemer; Ralph E. Locher

(57) ABSTRACT

A drinks machine is provided that has a drinks outlet, a housing region under the drinks outlet, and a drinks vessel housed by the housing region during a filling process. The housing region is a separate part and removable from the drinks machine.

18 Claims, 2 Drawing Sheets

DRINKS MACHINE

BACKGROUND OF THE INVENTION

The present invention relates to a drinks machine, in particular a coffee machine, having a drinks outlet and a housing region which is arranged thereunder.

Owing to an attractive design of drinks machines, and in particular of modern coffee machines, and owing to a significantly wider range of drinks that can now be produced using said drinks machines, these are being bought and installed in increasing numbers. In addition to the actual function, the design, which is to say an overall aesthetic impression, of the drinks machine or coffee machine is an increasingly important factor in the buying decision in this case. For this reason it is becoming increasingly important for manufacturers of such drinks machines or coffee machines to set designer focal points by means of which in particular a specific product line, range or even association with a specific brand name can be visually represented. In addition to the design of said coffee machines, ease of use and in particular ease of cleaning are increasingly important to the consumer.

BRIEF SUMMARY OF THE INVENTION

The present invention addresses the problem of specifying an improved embodiment of a generic drinks machine, in particular a coffee machine, which on the one hand offers a high degree of designer freedom and on the other hand is also particularly easy to clean if it becomes dirty.

This problem is solved according to the invention by the subject matters of the independent claims. Advantageous embodiments are the subject matter of the dependent claims.

The invention is based on the general concept of equipping a drinks machine, e.g. a coffee machine, with a housing region which is easily replaceable. As a result said housing region can easily be removed for cleaning purposes and on the other hand offers the possibility, e.g. by means of a corresponding color scheme, of creating designer highlights or emphasizing the association with a brand name or a product range of a specific brand name. In particular the ease of removal allows cleaning to take place away from the drinks machine, e.g. in a dishwasher, thereby enabling considerable additional benefit to be provided to the customer.

For the purpose of the invention there is provided on the housing arrangement at least one locking device, e.g. a clip element, by means of which the housing arrangement and hence the complete housing region can be locked on or in the drinks machine or coffee machine. In this case a locking device of this kind is preferably embodied as an easy-to-use and quickly releasable or fixable locking device, e.g. using clip elements as cited above, such that attaching the housing region to the drinks machine and detaching the housing region from the drinks machine, e.g. for cleaning purposes, is possible with little manual intervention and is therefore extremely simple. In this case it is obviously also conceivable for one or more clip elements to interact with further plug-in devices or undercuts. As a result of the extremely simple process for attaching or detaching the housing region to or from the drinks machine, said housing region can easily be removed for cleaning purposes and in addition allows a wide diversity of variants, since all manner of housing regions, e.g. in terms of shape and color, can easily be fixed onto the corresponding drinks machine or coffee machine and/or released again. In this case it is conceivable in particular for the drinks machine or coffee machine to be marketed as a standard appliance, while the housing region can be marketed in all manner of color schemes, both as an accessory and as a freely selectable option that is made with the drinks machine. In particular, owing to a wide diversity of variants that is achieved thus, it is possible to represent an association with a specific brand name or with a specific product range of a specific brand name in a particularly simple visual manner. Also likely to be of particular advantage is that, given all manner of color variants of the housing regions, individual customer preferences can be catered for and therefore, in addition to the actual functionality per se, customers can also be attracted by a design that speaks to them personally.

For the purpose of the invention the housing region has a housing arrangement and a support assembly embodied in a complementary form thereto, wherein the drinks vessel or cup can be placed on the support assembly and wherein the support assembly is height-adjustable within the housing arrangement. According to the invention the housing arrangement is in this case essentially upright and embodied in the form of a semi-cocoon, with the support assembly being peripherally surrounded by the housing arrangement. Because the support assembly can be locked at least two different height settings within the housing arrangement, both small drinks vessels such as e.g. an expresso cup and large drinks vessels such as e.g. a latte macchiato glass can be placed at the correct height under a drinks outlet of the drinks machine or coffee machine, without having to worry that an excessive distance between the drinks vessel and the drinks outlet when the drinks vessel is filled might result in unwanted spattering and hence soiling of the housing region. The housing region can therefore be adapted easily to drinks vessels of different sizes, and therefore already benefits from a significantly reduced risk of soiling.

In an advantageous development of the solution according to the invention the support assembly has a rest surface that allows at least localized passage of liquids, and a collection device which is arranged thereunder. The rest surface, which allows at least localized passage of liquids and is embodied e.g. in the form of a rack, therefore allows any incorrectly guided drink portion to drain away, e.g. if the drinks vessel overflows during the filling process, wherein the overflow drink portion can be reliably and hygienically collected in the collection device which is arranged thereunder. By removing the support assembly and the collection device from the housing arrangement, the collection device can easily be emptied and cleaned again.

In a further advantageous embodiment of the inventive solution a retaining bracket is arranged on the rest surface or on the collection device, said retaining bracket being embodied as a projection, as of a peaked cap, and in addition having a conical shape, such that the support assembly automatically aligns itself when the retaining bracket is inserted into the opening that is provided in the housing arrangement. The special shape of the retaining bracket therefore not only allows self-locating and easy insertion of the support assembly into the housing arrangement, and hence particularly simple adjustment of the height of the support assembly, but also allows automatic horizontal alignment of the support assembly during the process of inserting the retaining bracket into the corresponding opening, thereby ensuring a horizontal rest surface on which the drinks vessel or coffee cup can stand safely. In this case the retaining bracket embodied in the form of a peaked-cap projection can be integrally molded onto the support assembly, e.g. onto the rest surface or the collection device, and can therefore be manufactured at extremely low cost. The retaining bracket is preferably integrally molded onto the collection device in this case, with both the retaining bracket and the collection device preferably being embodied as injection-molded plastic parts. The rest surface, on the other hand, can be made of metal, e.g. for aesthetic reasons, but can obviously also be made of plastic.

Further important features and advantages of the invention will emerge from the dependent claims, from the drawings and from the associated description of the figures with reference to the drawings.

It is to be understood that the features cited above and the features yet to be explained below can be used not only in the respective specified combination, but also in other combinations or individually, without thereby departing from the scope of the present invention.

BRIEF DESCRIPTION OF THE DRAWINGS

Preferred exemplary embodiments of the invention are illustrated in the drawings and explained in further detail in the following description, wherein the same reference signs relate to identical or similar or functionally identical components, and wherein.

DETAILED DESCRIPTION OF EXEMPLARY EMBODIMENTS OF THE PRESENT INVENTION

Figure 1:
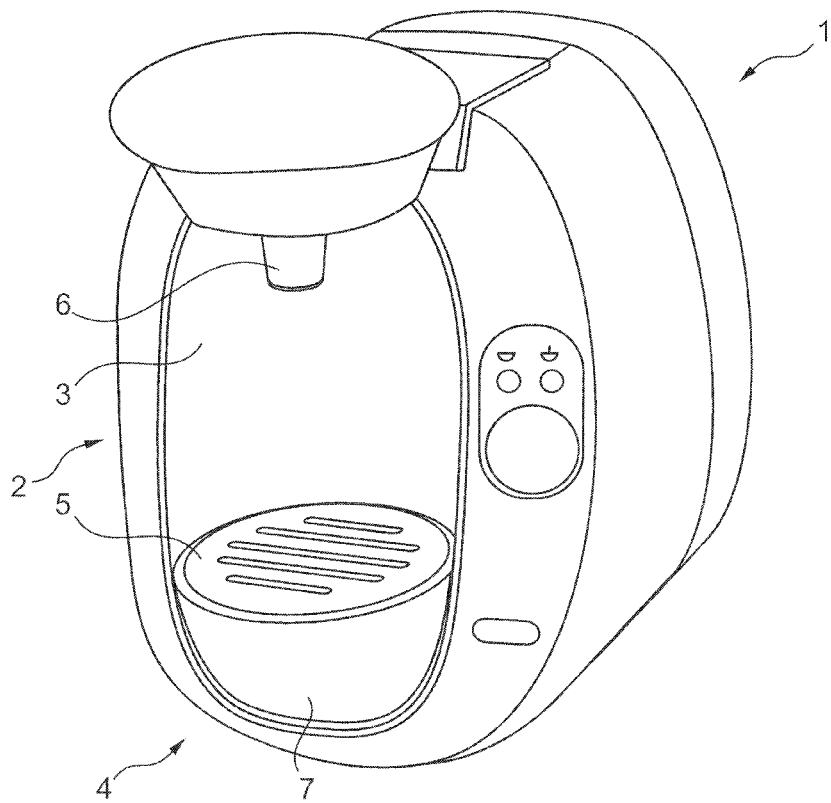
FIG. 1 schematically shows a view of a coffee machine having an installed housing region according to the invention, FIG. 2 schematically shows the coffee machine depicted in FIG. 1, its housing region being illustrated separately, FIG. 3 schematically shows a view of the housing region having the support assembly and the housing arrangement, FIG. 4 schematically shows a process whereby the support assembly is inserted into the housing arrangement.
Figure 2:
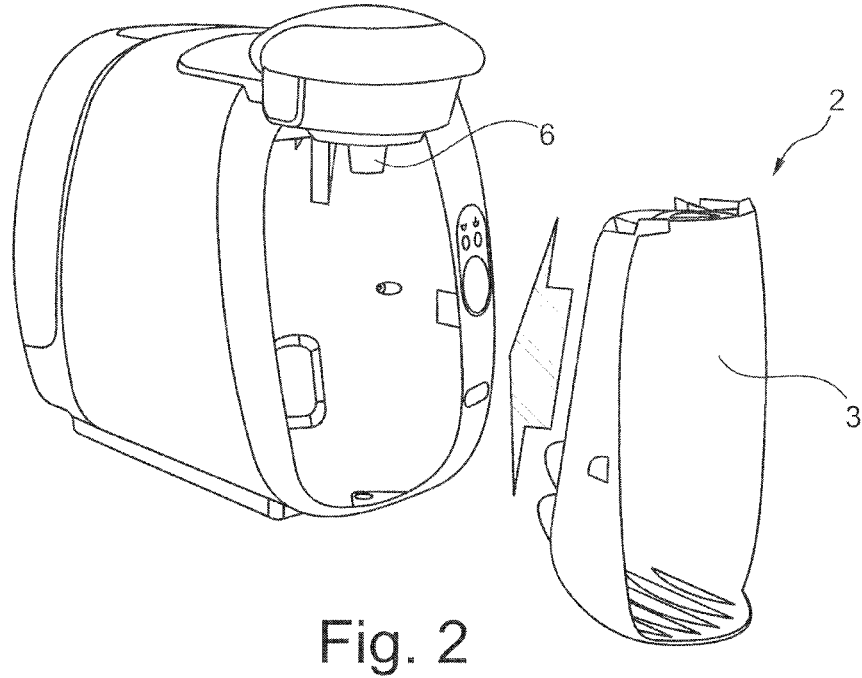
Figure 3:
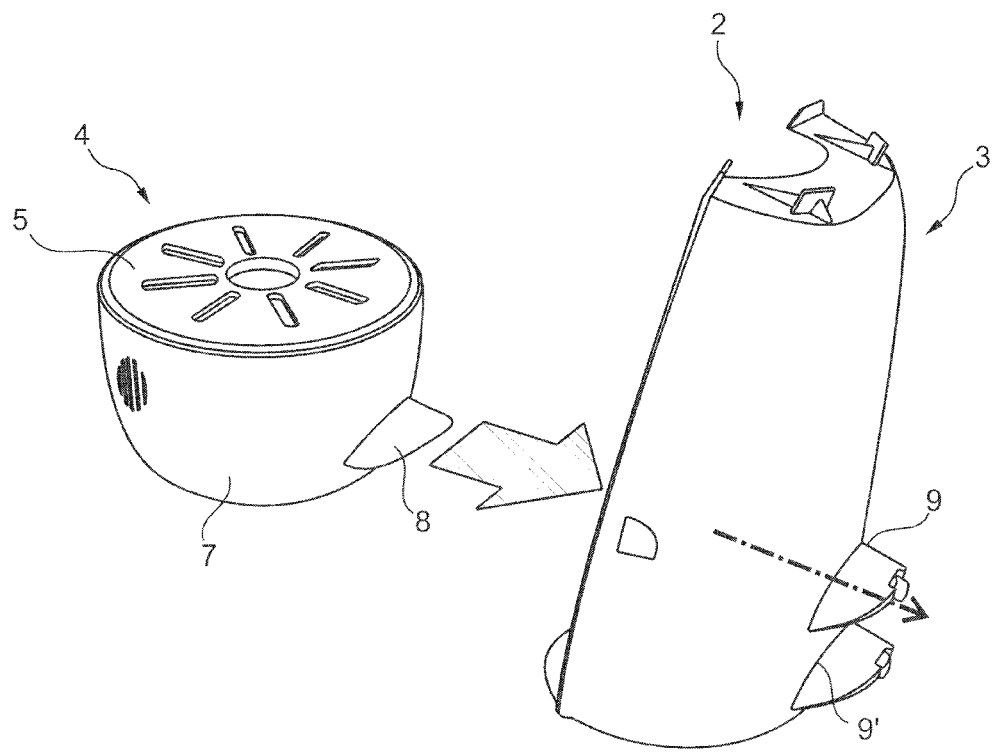
Figure 4:
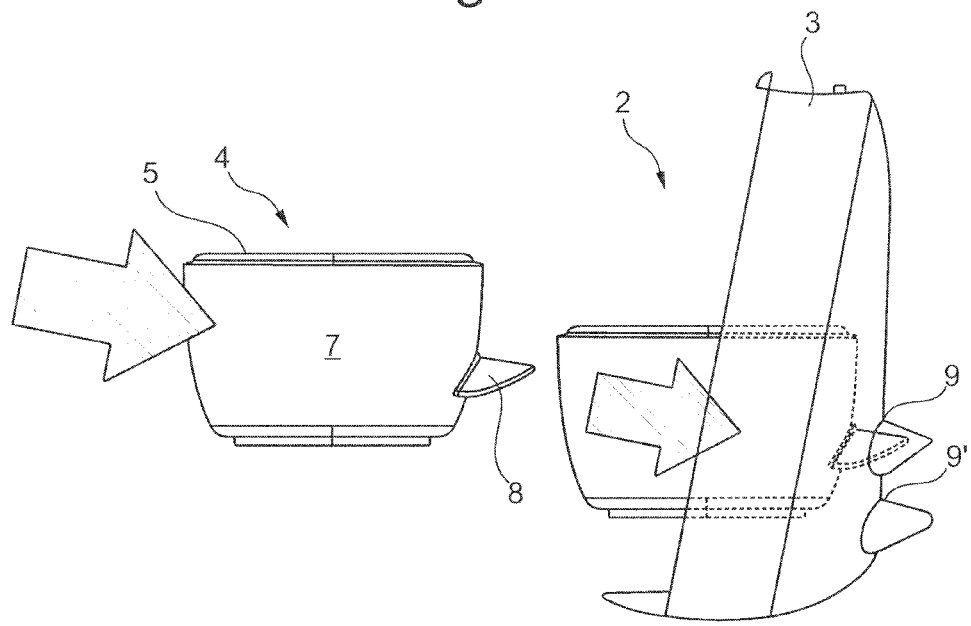

Referring to FIG. 1, a coffee machine 1, which can also be embodied generally as a drinks machine, has a housing region 2 for housing/holding a drinks vessel (not shown) in the drinks machine or coffee machine 1. For greater clarity of illustration purposes the housing region 2 is shown broken down into its components in the schematic according to FIG. 3, said housing region 2 comprising an essentially upright housing arrangement 3 embodied in the form of a semi-cocoon and a support assembly 4 embodied in a complementary form thereto. In order to ensure that drinks vessels of different sizes, such as e.g. an espresso cup or a latte macchiato glass, can be filled without soiling, the support assembly 4 can be locked in the housing arrangement 3 at least two different height settings. The drinks vessel is normally placed on a rest surface 5 of the support assembly 4 in this case. Accordingly, if e.g. an expresso cup is to be filled with expresso, the support assembly 4 is locked at a higher position in the housing arrangement 3 than would be the case when filling a latte macchiato glass. By virtue of the height-adjustable support assembly 4 it is therefore possible to fill drinks vessels of different sizes easily, without having to worry that spattering of the housing region 2 might occur due to an excessive distance between a drinks outlet 6 and the drinks vessel.

Of crucial importance to the inventive solution is that the housing region 2 is embodied as a separate part which is fixed in or on the drinks machine 1 as required, i.e. when it is used. It is therefore possible on the one hand to remove the housing region 2 easily for cleaning purposes, and e.g. clean it in a dishwasher, and on the other hand to offer all manner of embodiments of the housing region 2 by means of which e.g. different product lines or ranges of a brand name or even the association with a brand name can be emphasized as a designer element.

It goes without saying that no safety-related entities such as e.g. electric cables will be freely accessible in a space that is exposed by the housing region 2 when the latter is detached.

It can be seen that the support assembly 4 is composed of the rest surface 5, this allowing at least localized passage of liquids, and a collection device 7 which is arranged thereunder. By virtue of the rest surface 5, which allows at least localized passage of liquids, and the collection device 7 that is situated thereunder, any overflow liquid, for example, can be collected safely and reliably, and can be stored until disposal.

For the purpose of locking the support assembly 4 in the housing arrangement 3, a retaining bracket 8 is arranged on the collection device 7 and can be inserted alternatively into at least two separate openings 9 and 9' that are provided in the housing arrangement 3. In this case it is of course possible for the openings 9 and 9' to be embodied as pockets having a form that is complementary to the retaining bracket 8. In this case an internal contour of the at least two openings 9 and 9' or correspondingly embodied pockets is or are typically embodied as complementary in form to an external contour of the retaining bracket 8, such that this can preferably be introduced into the openings 9 and 9' or pockets with positive fit. In this case the retaining bracket 8 is inventively embodied in the form of a peaked-cap projection and has a conical shape, such that the support assembly 4 automatically aligns and levels itself, particularly in a horizontal direction, when the retaining bracket 8 is inserted into the associated opening 9 or into the associated pocket. In this way it is possible to ensure a permanently horizontal rest surface 5 on which the drinks vessel can safely be placed.

For the purpose of locking the housing arrangement 3 in the coffee machine 1 and hence locking the housing region 2 in the coffee machine 1, at least one locking device (e.g. a clip element) is provided on the housing arrangement 3, which locking device, alone or in conjunction with further locking and plug-in connections (not shown), ensures that the housing region 2 can be reliably fixed to the coffee machine 1 and can also be installed and released with ease.

In this case, both the housing arrangement 3 and the support assembly 4 can in principle be made of metal or plastic, with the individual components 3, 4, 5 and 7 of the housing region 2 being embodied to be dishwasher-safe, such that cleaning of the housing region 2 does not necessarily have to be done manually, but can easily be done in a conventional dishwasher.

The ease with which the housing region 2 can be released from the coffee machine 1 or associated drinks machine not only allows it to be cleaned particularly easily, but also allows an individual embodiment, particularly a color embodiment and designer embodiment, of the housing region 2, thereby also allowing a flexible response to specific and individual customer preferences. By means of a corresponding designer embodiment of a housing region 2 it is moreover easily possible visually to represent the association with a brand name or with a specific product range of said brand name. By virtue of the height-adjustable support assembly 4 it is moreover possible reliably to avoid undesirable and premature soiling of the housing region 2, particular of an inner wall of the housing arrangement 3.

LIST OF REFERENCE SIGNS

1 Drinks machine/coffee machine
2 Housing region
3 Housing arrangement
4 Support assembly
5 Rest surface 6 Drinks outlet
7 Collection device
8 Retaining bracket
9 Opening/pocket

The invention claimed is:

1. A drinks machine, comprising:
a main body having a front face, the main body including a drinks outlet and an opening in the front face of the main body, said opening having a profile;
a housing arrangement to house a drinks container underneath the drinks outlet, the housing arrangement having an outer profile matching the profile of the opening;
the housing arrangement being configured for being inserted into the opening and for being fixedly disposed in a locked position in the opening; and
the housing arrangement being configured to be removable from the opening; and
a support assembly on which the drinks container is placed, the support assembly being mounted onto the housing arrangement for being height adjustable relative to the housing arrangement.

2. The drinks machine of claim 1, wherein the drinks machine is a coffee machine.

3. The drinks machine of claim 1, wherein the housing arrangement is an upright housing arrangement and in the form of a semi-cocoon.

4. The drinks machine of claim 3, wherein the upright housing arrangement is an injection-molded panel.

5. The drinks machine of claim 1, wherein the housing arrangement has a locking device to lock the housing arrangement in the locked position the main body.

6. The drinks machine of claim 5, wherein the locking device is a clip element.

7. The drinks machine of claim 3, wherein the upright housing arrangement is dishwasher-safe.

8. The drinks machine of claim 1, wherein the support assembly has a bracket formed thereon and the housing element has two pockets formed therein at different elevations, each of the two pockets for individually and selectively receiving the bracket and setting a height position of the support assembly.

9. A housing arrangement for a drinks machine, the housing element comprising:
a main body having a front face, the main body including a drinks outlet and an opening in the front face of the main body, said opening having a profile;
a housing element configured to house a drinks container underneath the drinks outlet, the housing element having an outer profile matching the profile of the opening;
wherein the housing element is configured to be inserted into the opening and to be fixedly disposed in a locked position in the opening; and
a support assembly on which the drinks container is placed, the support assembly being mounted onto the housing element to be height adjustable relative to the housing element;
wherein the housing element is configured to be removed from the opening.

10. The housing arrangement of claim 9, wherein the drinks machine is a coffee machine.

11. A drinks machine, comprising:
a main body having a front face, the main body including a drinks outlet and an opening in the front face of the main body, said opening having a profile; and
a housing arrangement to house a drinks container underneath the drinks outlet, the housing arrangement having an outer profile matching the profile of the opening;
the housing arrangement being configured for being inserted into the opening and for being fixedly disposed in a locked position in the opening; and
the housing arrangement being configured to be removable from the opening, the housing arrangement being an upright housing arrangement and in the form of a semi-cocoon;
a support assembly being complementary to the upright housing arrangement and on which the drinks container is placed, the support assembly being locked in the upright housing arrangement at at least two different height settings relative to the housing arrangement.

12. The drinks machine of claim 11, wherein the support assembly has a rest surface and a collection device, the rest surface being for supporting the drink container and having an opening to allow for at least localized passage of liquids into the collection device, the collection device being arranged under the rest surface.

13. The drinks machine of claim 12, further comprising a retaining bracket arranged on one of the rest surface and the collection device and which is inserted alternately into at least two openings that are spaced apart from each other and that are arranged in the housing arrangement.

14. The drinks machine of claim 13, wherein an internal contour of the at least two openings in the housing arrangement is complementary to an external contour of the retaining bracket.

15. The drinks machine of claim 13, wherein the retaining bracket is a peaked-cap projection having a conical shape such that the support assembly automatically aligns itself when the retaining bracket is inserted into a respective one of the at least two openings.

16. The drinks machine of claim 12, wherein the collection device is cup-shaped.

17. The drinks machine of claim 11, wherein at least one of the upright housing arrangement and the support assembly are made of one of metal and plastic.

18. The drinks machine of claim 9, wherein the support assembly has a bracket formed thereon and the housing arrangement has two pockets formed therein at different elevations, each of the two pockets for individually and selectively receiving the bracket and setting a height position of the support assembly.

* * * * *